(12) United States Patent
Frippiat

(10) Patent No.: US 6,521,276 B1
(45) Date of Patent: *Feb. 18, 2003

(54) STABILIZED FOOD COMPOSITION

(75) Inventor: Anne Frippiat, Sterrebeek (BE)

(73) Assignee: Raffinerie Tirlemontoise S.A. (BE)

( * ) Notice: Subject to any disclaimer, the term of this patent is extended or adjusted under 35 U.S.C. 154(b) by 0 days.

This patent is subject to a terminal disclaimer.

(21) Appl. No.: 08/578,616

(22) PCT Filed: Mar. 28, 1994

(86) PCT No.: PCT/BE94/00025

§ 371 (c)(1),
(2), (4) Date: Jan. 11, 1996

(87) PCT Pub. No.: WO94/22327

PCT Pub. Date: Oct. 13, 1994

(30) Foreign Application Priority Data

Mar. 26, 1993 (BE) ............................................. 9300307

(51) Int. Cl.⁷ ............................. A23L 1/05; A23L 1/29; A23L 1/31
(52) U.S. Cl. ................... 426/332; 426/334; 426/573; 426/574; 426/582; 426/603; 426/613; 426/658
(58) Field of Search ................................. 426/658, 582, 426/334, 332, 573, 574, 603, 613

(56) References Cited

U.S. PATENT DOCUMENTS

| | | | |
|---|---|---|---|
| 5,169,671 A | | 12/1992 | Harada et al. ............... 426/658 |
| 5,527,556 A | * | 6/1996 | Frippiat et al. .............. 426/573 |
| 5,846,592 A | * | 12/1998 | Alderliesten et al. ........ 426/601 |

FOREIGN PATENT DOCUMENTS

| | | | |
|---|---|---|---|
| EP | 0 532 775 A1 | 9/1991 | ............ A23L/1/236 |
| EP | 0 470 870 A1 | 12/1991 | ............ A23L/1/236 |
| EP | 0 509 707 A1 | 4/1992 | .......... A23L/1/0532 |
| JP | 03280857 A | 12/1991 | ............ A23L/1/307 |
| JP | 04/210578 | 7/1992 | ............ A23L/1/307 |
| JP | 4311371 | 11/1992 | |
| SU | 1482639 | 5/1989 | |
| WO | 93/06737 | 4/1993 | ............. A23G/1/00 |

OTHER PUBLICATIONS

Food Ingredients Europe—Conference Proceedings—Nov. 1992, Rafticreming: The New Process Allowing to Turn Fat Into Dietary Fiber, pps 193–197.
Brochure—Fibruline, Natural Low–Calorie Fibre (Cosucra, Sep. 1990), pags. 1–8.
Leaflet—Raftilose and Raftiline (Dr. Georges Smits and Dr. Barrie Norman, IBC Bulking agents Conference, Atlanta, Mar. 13, 1991, pp. 1–9.
Brochure—Raftiline, (Raffinerie Tirlemontoise SA, publication date 1992, pp. 1–20.
Article—Sweeteners and functional food ingredients from chicory, J. Fockedey, Cosucra, Belgium, pp. 288–289, in English and Swedish.
Food Ingredients Europe, Conference Proceedings, 1989, Porte de Versailles, Paris, 27, 28, Sep. 29, 1989, Actilight, a low calorie sweetener, Dr. B. Thiriet, pp. 267–270.

* cited by examiner

Primary Examiner—Helen Pratt
(74) Attorney, Agent, or Firm—Hayes Soloway P.C.

(57) ABSTRACT

A stabilized food composition with a reduced dry matter content, wherein the stabilizing agent is a fructane or fructane mixture in an amount of 1–15 wt % and to 1–25% of the water content of said food composition.

7 Claims, No Drawings

STABILIZED FOOD COMPOSITION

TECHNOLOGICAL BACKGROUND OF THE INVENTION

Our present sedentary way of living characterized by an almost complete absence of intense Although energetic food needs are lower, our food is still too rich in sugars and fats and too poor in alimentary fibers.

Many medical publications supported by media have sensitized the public opinion about the relationship existing between too high energy foods and fat absorption and health problems like obesity, cardiovascular diseases, respiratory troubles, etc., whence consumers are realizing the necessity of a healthier and more equilibrated food.

Moreover the idea that beauty is necessarily associated to slenderness leads to an increased demand of so-called "light" foodstuffs (with a low calorie and fat content).

Thus, there is presently a real need for appropriate food compositions to be used in an equilibrated alimentation, comprising a fat substitute and holding the gustative and physical properties of the conventional food compositions.

In other terms, the consumers require foodstuffs with a low calorie and fat content, but which should be as appetizing as conventional foodstuffs, i.e. those foodstuffs should have identical texture, mouth taste and flavour.

However, the fat content reduction in foodstuffs leads to deep changes of their organoleptic characteristics.

In that context, it is interesting to mention here the results of a taste evaluation test carried out by Leatherhead Food Research Associates (review of the conference "Development of low-fat/lower calorie food products" held in The Hague, March 1992) on spreading pastes. Spreading pastes with a reduced fat content have been always distinguished from other pastes with a normal fat content. Spreading pastes with a normal fat content were characterized by a smooth texture and a bright aspect, whereas those with a reduced fat content showed a different flavour and a granulous gelatinous firm texture.

Consequently, the fat content reduction in foodstuffs often requires to mix additive-agents to those foodstuffs so as to provide an acceptable texture. Thus, in the above-mentioned example, the spreading pastes contained gelatine, modified starch, xanthan gum and/or caseinate.

Another important problem lies on the physical and microbiological stability of those products.

When fat is removed from a food composition, it leads generally to a reduction of the dry material and an increase of the free water content.

Those changes in the food composition are expressed by a water activity change which is a measurement of the free water quantity in the food composition and influences particularly the product microbiological safety and stability.

Thus, low fat content spreading pastes requires adding a preservative agent such as potassium sorbate (not added to a high fat content product) which has a shorter lifetime.

The water activity and acidity are the two main factors that influence the product microbiological safety. For many products, it is thus important to know the principles of using acids as preservative agents, since the preservation effects vary with the acids and the quantities thereof.

PRIOR ART

In light foodstuffs, many fat substitutes have been marketed or are being developed.

The present situation of fat substitutes has been quite well described in the article "Les substituts des graisses, lucratifs mais risqués" published in International Food Ingredients, 1991, N° 2, pp. 4–11.

Essentially all those products are characterized by a poor heat stability, which restricts their use to foodstuffs prepared at quite low temperatures.

Moreover the quality of the food compositions obtained by using those products is generally characterized by a less smooth texture, a thicker mouth taste and/or unwanted flavours.

The advantages associated with the use of inulin in food compositions have been patented by the company Raffinerie Tirlemontoise.

The use of fructanes such as for example inulin in food compositions has a number of advantages:

inulin is an easily available material which can be obtained from various plants such as Cichorium Intybus;

inulin is a polydisperse product with generic formula GFn (G=glucose, F=fructose, n varying from 2 to more than 60), the fructose units being connected to each other through a binding $\beta$ (2–1), and which presents, favorable nutritive properties such as its bifidogenous effect, alimentary fiber behaviour and very low calorie content (<2 kcal/g).

Patent Application PCT/BE92/00042 describes particularly the use of a composition having a cream structure in:

ice cream: as a substitute for 50% or more of the fat material with excellent organoleptic characteristics;

waffles: as a substitute for 50% of the fat matter;

spreading pastes (of minarine type): as a partial substitute for oil and fat. A spreading paste composition is described therein with only 30% of fat with neither flavour nor texture alteration;

liver pie: as a substitute for a part of fat. A liver pie composition is described therein in which 15% fat and 15% inulin cream have been substituted for 30% fat (bacon), that means a 50% fat reduction.

Patent Application PCT/BE92/00043 describes hydrous lipophile compositions comprising an aqueous ingredient in which water is immobilized.

European Patent Application N° 532 775 (under Ajinomoto's name) describes a foodstuff containing a polyfructane prepared by a sugar or inulin enzymatic lengthening so as to obtain long chain polymers. The so-prepared polyfructane is used as a substitute for food components such as oil, fat, sugar, thickeners and/or gelling agents in foodstuffs. This polyfructane is substituted totally or partially for the food component.

That substitution is provided either with the addition of a pasty structure (20 or 25%) or with a polyfructane quantity equivalent to the quantity substituted.

Japanese Patent Application N° 4 311 371 (under Ajinomoto's name) describes water retention properties of a polyfructane of a molecular weight between 5,000 and 15,000,000. This polyfructane is substituted for an identical quantity of an available sugar in ice cream (example 8) or jam (examples 9 and 10).

On the other hand, that last-mentioned Patent Application mentions that polyfructane stabilizes deliquescence (tendency of the solid foodstuffs to absorb atmospheric moisture and to become liquid), preferably of solid foodstuffs which contain products such as polydextrose, fructoligosaccharide, aspartame, sorbitol, etc., which are known to be unstable.

All above-mentioned examples and applications offer possibilities to use other components as substitutes for fats and/or sugars in the food compositions.

The Applicant does not seek, however, to use other substances as substitutes for fats in foodstuffs, but aims at removing fats and consequently reducing product dry matter with no addition of big quantities of other ingredients (except for water).

The fat content reduction in foodstuffs involves problems of microbiological stabilization and texture and flavour conservation in the product obtained when the dry matter quantity is reduced and/or the free water quantity is increased.

In the prior art, to palliate that problem, various additives are mixed with the foodstuffs.

For example, U.S. Pat. Ser. No. 91/03270 of First World Cheese describes the production of various low fat content cheese types from a milk containing 0.01% to 0.3% fats, adding carrageenan (0.06%) as a stabilizing agent to increase water retention.

The authors notice that, in absence of carrageenan, the cheeses obtained present a rough or pasty aspect and an unwanted smell.

U.S. Pat. Ser. No. 91/07100 of Kraft General Foods describes the production of a non fatty natural cheese from skim milk to which a microgel (product made from alginates) or an hydrocolloid (made from agar, carrageenan, xanthan, etc.) is added, which according to the authors provides to the finish product with a flavour identical to fat.

It is to be noticed that the additive content varies from 0.5 to 50% on base of dry matter.

Although the incorporation of additives allows at some extent to settle the problem of stabilization in lower fat content foodstuffs, their presence in said products will lead to distrust reactions and even reject from the consumers sensitized by a concept of healthy food free from any "foreign" additive as much as possible. Moreover, the use of additives in foodstuffs in various countries is strictly regulated, the harmonization between the various laws being not yet carried out.

OBJECTS OF THE INVENTION

The present invention aims at providing a stabilized lower dry matter foodstuff, particularly with a lower fat content and which has stabilized texture and mouth taste as well as an improved microbiological time stability.

Particularly, the present invention aims at providing a foodstuff which does not require any addition of important quantities of food additives as stabilizing agent, emulsifier or similar.

CHARACTERISTICS OF THE INVENTION

It is possible to obtain an avantageous substitution for 5 to 75 wt % fat content in a foodstuff of small quantities (from 1 to 15 wt %) of a natural food component comprising a fructane or a fructane mixture, while providing the texture, mouth taste and microbiological time stability in said foodstuff in spite of a reduction of the dry matter content.

The so obtained food composition is characterized by a fructane or a fructane mixture content of 1 to 25% with respect to water contained in said food composition without that mixture giving rise to the formation of a creamy structure, nor behaving as a creamy structure nor being used as a cream as described in Patent Application PCT/BE92/00042.

Many light foodstuffs in which there is used water or a mixture of water and a fat substitute for fat, have clearly lower texture, mouth taste and microbiological stability than standard foodstuffs.

It has been shown surprisingly that the advantageous reduction of large fat quantities and the addition of small quantities of a natural food component comprising a fructane or a fructane mixture in a foodstuff do not alter the organoleptic properties (texture, mouth taste, etc.) of said foodstuff.

In other words, it is possible to hold the stability of a foodstuff by reducing its quantity of dry matter (that is to say by increasing the water percentage) while adding a fructane to said foodstuff.

Thereafter, the term "stabilized food composition" means a food composition containing a natural food component (such as fats, sugars, etc.) comprising a fructane or a fructane mixture allowing to reduce the dry matter in said foodstuff while providing its stabilization.

Advantageously, said fructane can for example consist in the product Raftiline® developed and marketed by the company Raffinerie Tirlemontoise. Raftiline® contains inulin, which is a easily available substance obtained from various wide-spread plants, more particularly in the case of Raftiline® from Cichorium Intybus.

Inulin is a polydisperse composition of saccharides having the formula GFn (G=glucose, F=fructose, n varying from 2 to 60), the fructose units of which are connected to each other by a binding $\beta$ (2–1).

Besides inulin (a saccharide the polymerization degree of which is higher than 2) which represents more than 92% of the dry matter, Raftiline® also contains glucose and fructose (2% of the dry matter) as well as saccharose (6% of the dry matter). Raftiline® is thus characterized by a slightly sweetened taste (10% of saccharose one) with no after-taste and by a neutral smell.

Moreover, the presence of low molecular weight saccharides can result in inconvenience in terms of tolerance to Raftiline® during digestion (feeling of swelling and intestinal pressure). Thus, it is particularly advantageous to reduce the total proportion of said components in foodstuffs such as pork meat products and other meat-based products where the sweetening capacity of a product is particularly disadvantageous.

According to the invention, it is thus favourable to substitute for the fat matter present in a foodstuff, such as meat-based food preparations, very small quantities of Raftiline® while providing the stability of said foodstuff.

Advantageously, fructane or a component of the fructane mixture is unbranched inulin, branched inulin or partially, hydrolyzed inulin the favourable nutritive properties are described in Patent Application PCT/BE91/00042 incorporated therein by reference.

Advantageously, inulin is free from any saccharides the polymerization degree of which is lower than or equal to two, preferably free from saccharides the polymerization degree of which is lower than or equal to 10.

Water in foodstuffs may exist as free water or bound water. Free water may "migrate" into the foodstuff, act as a solvent, react biochemically and assist in microbiological growth.

Bound water is associated to other chemical entities in the foodstuff through generally weak interactions, but which can go up to important chemical bindings.

Water activity is a parameter to quantify the free water content in a product.

Surprisingly, the advantageous substitution for 5 to 75 wt. % fat content in a foodstuff by small quantities of a natural food component comprising a fructane or a fructane mixture, does not lead to an increase of water activity and consequently the free water quantity in the food composition is not increased.

Thus, said foodstuffs do not require synthetic additives.

The invention will be now described more in details in the following examples given only as an illustration of the invention.

EXAMPLE 1
Gouda cheese

| Composition (wt. %) | | |
|---|---|---|
| | Product with Raftiline ® LS | Standard product |
| Full milk (3.5% fat) | 47.10 | 99.2 |
| Skim milk | 47.10 | — |
| Raftiline ® LS | 5.00 | — |
| β-carotene (or annato) | q.s | q.s |
| Rennet | q.s | q.s |
| Lactic ferments | 0.80 | 0.80 |
| Calcium chloride | 0.02 | 0.02 |
| Sodium nitrate | 0.005 | 0.005 |

Process

Mix full milk and skim milk so as to obtain a fat content of 1.7%.

Add Raftiline® LS (an inulin free from saccharides the polymerization degree of which is lower than or equal to 2) with milk and mix until you obtain an homogeneous mixture.

Pasteurize milk at 75° C. for 20 seconds.

Cool to 30° C.

Add β-carotene, rennet, lactic ferments, calcium chloride and sodium nitrate.

After a minimum coagulation time of 30 minutes at 30° C., work on the coagulum with a basting-spoon and remove the first lactoserum.

Wash the curdled milk with water, stir and remove the second lactoserum.

Press, salt and let the cheese go to maturation (3 weeks).

| Characteristics of the finished product | | |
|---|---|---|
| | Product with Raftiline ® LS | Standard product |
| Dry matter (D. M.) | 47.6% | 64.0% |
| D. M. reduction | 25.6% | — |
| Inulin | 5.9% | — |
| Inulin/water | 11.2% | — |
| Fat | 11.1% | 29.0% |
| Fat/D. M. | 23.3% | 45.3% |
| Fat reduction | 62% | — |
| Caloric value/100 g | 219 kcal | 365 kcal |
| Caloric reduction | 40% | — |

Most of the lean cheeses have a rubbery aqueous structure when the fat content is reduced to less than 35% on dry material.

By using inulin as an ingredient, a better structure and a better mouth taste are obtained than in the case of a lean cheese with no inulin.

That is applicable to lean cheeses the fat content of which varies from less than 10% to 35% on dry material and to all the cheese kinds such as hard paste cheeses (for example Gouda, Cheddar), semi-hard cheeses (for example Saint Paulin, Munster), soft paste cheeses (for example Port Salut, Brie, Camembert), lactoserum cheeses, herb cheeses, smoked cheeses, . . .

Thus, by adding 5 wt. % Raftiline® LS and substituting skim milk for about 50% full milk, a Gouda cheese has been obtained the dry matter of which has been reduced 26% and which does not contain more than 23.3% fat material on dry matter, i.e. a 62% reduction with respect to a full cheese containing 45.3% fat matter on dry matter. This lower fat content cheese has a smooth soft texture comparable to the reference fat rich product.

EXAMPLE 2
Liver Sausage

| Composition (wt. %) | | |
|---|---|---|
| | Product with Raftiline ® LS | Standard product |
| Pork liver | 30.00 | 30.00 |
| Pork brains | 10.00 | 10.00 |
| Pork head | 35.5 | 6.6 |
| Pork cheeks | 3.3 | 50.00 |
| Pork fat | — | 1.0 |
| Water | 9.80 | — |
| Spice mixture | 0.60 | 0.60 |
| Nitrite salt (0.9%) | 1.80 | 1.80 |
| Raftiline ® LS | 9.00 | — |

Process

The pork head and cheeks are put in brine containing the nitrite salt. After a residence time of 24 hours at 15° C., the meat as well as the brine and the Raftiline® LS are boiled for 90 minutes at 90° C. The stuffing is then prepared with the liver, the brains and the spice mixture. The preparation of the emulsion is made in a bowl chopper by vacuum cooking. The emulsions are introduced in casings immediately after their preparation and heated at 80° C. for 90 minutes. After a 60 minute cooling, the sausages are held at 4° C.

| | Product with Raftiline ® LS | Standard product |
|---|---|---|
| Dry matter (D. M.) | 37.2% | 49.4% |
| D. M. reduction | 24.7% | — |
| Raftiline ® LS | 8.5% | — |
| Raftiline ® LS/water | 13.5% | — |
| Fat | 12.7% | 32.9% |
| Fat reduction | 61% | — |
| Meat proteins | 13.3% | 13.6% |
| Caloric value/100 g | 182 kcal | 369 kcal |
| Caloric reduction | 51% | — |

In meat products such as liver sausages, Frankfurt sausages, hamburgers, it is possible to reduce the fat content by the use of lean meat, but with as a consequence too a soft wet structure, a mouth water taste and a poor microbiological stability.

By using inulin as an ingredient, products are obtained with are very close to the fat products in terms of texture and mouth taste. Moreover, the parameter of water activity is so reduced that the microbiological stability is improved.

Thus, by adding 9 wt. % Raftiline® LS to a liver sausage composition characterized by a wt. % of pork-head of 35.5% (instead of 6.6% in the standard product) and pork cheeks of 3.3% (instead of 50%), by removing 1% fat and incorporating 9.8% water, a liver sausage has been obtained the dry matter content of which is reduced 24.7% and which only contains 12.7% fat material (instead of 32.9%), i.e. a 61% reduction with respect to the standard product.

The results of the measurements of water activity as well as the hardness (expressed in Newtons), carried out on a standard sausage, on a light sausage containing 9 wt. % Raftiline® LS and on a light sausage prepared as above described, but containing no Raftiline® LS are represented in the following table:

TABLE

Comparison of various liver sausage compositions

| | Standard sausage 32.9% fat (1) | Light sausage w/Raftiline ® LS 12.7% fat (2) | Light sausage without Raftiline ® LS 12.7% fat (3) |
| --- | --- | --- | --- |
| Water activity | 0.970 | 0.970 | 0.985 |
| Hardness (N) | 55 | 54 | 39 |

It comes out clearly from those results that, by incorporating Raftiline® LS, the light sausage has practically the same physical characteristics as those of a standard sausage. Moreover, a panel of 20 tasters has clearly given the preference to sausages (1) and (2) in terms of taste and texture.

EXAMPLE 3

Spreading Paste

Composition (wt. %)

| | Product with Raftiline ® LS | Standard product |
| --- | --- | --- |
| Fat phase | 20.00 | 80.00 |
| Soya oil | 11.86 | 56.40 |
| Soya oil 38 | 4.40 | 15.09 |
| Hydrogenated soya oil 45 | 1.92 | 3.97 |
| Palm oil | 0.96 | 3.97 |
| Emulsifier (Grindsted Triodan R90) | 0.50 | — |
| Emulsifier* | 0.36 | 0.80 |
| β-carotene (5.3%) | 0.02 | q.s. |
| Aroma (Grindsted aroma 2934) | 0.02 | q.s. |
| Aqueous phase (pH 4.7) | 80.00 | 20.00 |
| Water | 63.38 | 18.40 |
| Raftiline ® LS | 10.00 | — |
| Skim lactoserum powder | — | 1.00 |
| Potassium sorbate | 0.10 | 0.10 |
| Salt | 0.50 | 0.50 |
| Aroma (Grindsted aroma 2935) | 0.02 | q.s. |

*Grindsted Dimodan LS for the product with Raftiline ® LS and Grindsted Lecidan/Lecithine in a ratio of 1:1 for the standard product.

Process

Mix salt, potassium sorbate and aroma in water. Adjust pH at 4.7 with lactic acid. Heat at 80° C. Add Raftiline® LS under stirring. Homogenize the solution at 45° C.

Prepare the oil mixture.

Heat at 45° C. Pour slowly the aqueous phase into the fat phase while mixing thouroughly (avoid incorporation of air bubbles). Hold the emulsion at 45° C. and cool to 10° C. in a Schröder type heat exchanger.

Pack and store in the refrigerator.

Characteristics of the product

| | Product with Raftiline ® LS | Standard product |
| --- | --- | --- |
| Dry matter (D. M.) | 29.5% | 80.0% |
| Inulin | 9.4% | — |
| Inulin/water | 13.3% | — |
| Fat | 20.0% | 80.0% |
| Fat reduction | 75% | — |
| Caloric value/100 g | 190 kcal | 724 kcal |
| | 79.5 kJ | 3029 kJ |
| Caloric reduction | 74% | — |

EXAMPLE 4

Mayonnaise

Composition (wt. %)

| | Product with Raftiline ® LS | Standard product |
| --- | --- | --- |
| Water | 59.7 | — |
| Sugar | 12.2 | 3.0 |
| Vinegar | 6.6 | 6.0 |
| Raftiline ® ST | 5.4 | — |
| Corn starch | 5.9 | 3.0 |
| Salt | 1.8 | 1.5 |
| Potassium sorbate | 0.1 | 0.05 |
| Soya oil | 2.7 | 80.0 |
| Full egg | 5.4 | — |
| Mustard | 0.2 | 1.5 |
| Egg yolk | — | 5.0 |

Process

Disperse potassium sorbate, Raftiline® ST and starch in water.

Mix until homogenization.

Add sugar, vinegar and salt while mixing.

Heat at 85° C. and cool to obtain a paste.

Mix half of the paste obtained with the oil.

Add the eggs and aerate for two minutes.

Add mustard and the rest of the paste.

Mix well and homogenize before any packing.

Characteristics of the finished product

| | Product with Raftiline ® ST | Standard product |
| --- | --- | --- |
| Dry matter (D. M.) | 27.5% | 87.6% |
| Fat | 2.7% | 80.0% |
| Inulin | 4.7% | — |
| Fat reduction | 97% | — |
| kcal/100 g | 102 | 744 |
| Caloric reduction | 86% | — |
| Aw value | 90.6 | 89.9 |
| D. M. reduction | 68.6 | — |
| Ratio inulin/vater | 6.5 | — |

What is claimed is:

1. A modified food composition characterized by a reduced amount of dry matter compared to a standard food composition, comprising 1 to 15 wt. % of inulin, relative to a fat content of a standard food composition, and 25–95 wt. % of fat relative to the fat content of the standard food composition, wherein the inulin is of the formula GFn wherein G represents a glucose unit, F represents a fructose unit and n ranges from 2 to 60, and that said inulin is free of saccharides having a degree of polymerisation lower than or equal to 2, the free water quantity in the composition is not increased based on the standard composition, the content of inulin based on the water contained in said composition is 1 to 25 wt. %, without that mixture of water and inulin giving rise to the formation of a creamy structure, and the organoleptic properties and the microbial stability over time of said food composition being identical to those of the standard composition.

2. The composition according to claim 1 wherein the inulin is selected from the group consisting of: a linear inulin, a branched inulin, a hydrolyzed inulin, and mixtures thereof.

3. The composition according to claim 1, wherein the inulin is obtained from Cichorium intybus.

4. The composition according to claim 1, wherein said composition is a cheese.

5. The composition according to claim 1, wherein said composition is a meat product.

6. The composition according to claim 1, wherein said composition is a spread.

7. The composition according to claim 1, wherein said composition is a mayonnaise.

* * * * *